(12) United States Patent
Sones

(10) Patent No.: US 7,950,332 B2
(45) Date of Patent: May 31, 2011

(54) APPARATUS AND METHOD OF GENERATING MOTION

(76) Inventor: Aaron Sones, Los Angeles, CA (US)

( * ) Notice: Subject to any disclaimer, the term of this patent is extended or adjusted under 35 U.S.C. 154(b) by 304 days.

(21) Appl. No.: 11/270,675

(22) Filed: Nov. 9, 2005

(65) Prior Publication Data

US 2006/0272540 A1    Dec. 7, 2006

Related U.S. Application Data

(60) Provisional application No. 60/686,301, filed on Jun. 1, 2005.

(51) Int. Cl.
*B60L 13/04* (2006.01)
*H02K 41/02* (2006.01)

(52) U.S. Cl. .................... 104/282; 310/12.01

(58) Field of Classification Search .............. 104/53, 104/55, 60, 69, 281, 282, 283, 284; 310/12–14, 310/127, 135
See application file for complete search history.

(56) References Cited

U.S. PATENT DOCUMENTS

| | | | | | |
|---|---|---|---|---|---|
| 4,386,777 | A | * | 6/1983 | Prehodka | 104/281 |
| 5,271,328 | A | * | 12/1993 | Boulais et al. | 102/207 |
| 5,931,714 | A | * | 8/1999 | Johnson | 446/129 |
| 6,191,507 | B1 | * | 2/2001 | Peltier et al. | 310/12.02 |
| 6,602,107 | B1 | * | 8/2003 | Hogan | 446/462 |

* cited by examiner

*Primary Examiner* — S. Joseph Morano
*Assistant Examiner* — R. J. McCarry, Jr.
(74) *Attorney, Agent, or Firm* — Arent Fox LLP

(57) ABSTRACT

An apparatus and method of generating motion including a track having at least one incline portion and at least one decline portion, a cart movably coupled to the track, and one or more magnets arranged along the track such that cart moves along the track by a combination of gravitational and magnetic forces. The motion generator may be used as a power source for a motor or electric generator.

31 Claims, 3 Drawing Sheets

APPARATUS AND METHOD OF GENERATING MOTION

CROSS-REFERENCE TO RELATED APPLICATIONS

The present Application for Patent claims priority to Provisional Application No. 60/686,301 entitled "Apparatus And Method Of Generating Motion" filed Jun. 1, 2005, hereby expressly incorporated by reference herein.

FIELD

The present disclosure relates generally to motion generation, particularly to motion generation using magnetic and gravitation forces.

BACKGROUND

Everyday people experience two natural forces: magnetism and gravity. For example, in an office paper clips can be collected in a container having magnetic force. In order to attract paper clips, the container must have a certain amount of magnetic force, and must be placed close enough to exert the force upon the paper clips. A magnetic container can collect paper clips therein simply because magnets attract things made of steel or iron, like paper clips.

The other common force in people's daily life is gravity, which is known as another natural force of attraction between two masses. Each particle of matter attracts every other particle with a force which is directly proportional to the product of their masses and inversely proportional to the square of the distance between them. But, when people speak of gravity, they usually refer to the force of attraction that the earth exerts upon objects thereupon to draw them toward the center of its body.

Magnetism and gravity are two forces of nature that are constantly turned on. Especially, the force of gravity is present everywhere, except in a vacuum environment. For example, a magnet can be placed in a way to pull up an object to a higher elevation, building up a reservoir of potential energy on the object. The potential energy increases as the object is lifted higher, and the distance that the force of gravity can pull becomes greater. The potential energy which has been built up on the object can be released as energy of motion, i.e., kinetic energy. The kinetic energy then can keep the object in motion. When the kinetic energy is exhausted, then the magnetic force from the magnet can pull the object to the higher elevation to build another reservoir of potential energy. The entire cycle of energy conversions can repeat over and over, as long as the forces of gravity and magnetism last.

SUMMARY

One aspect of a motion generator includes a track having an incline portion, a decline portion, and an apex where the inclined portion of the track meets the decline portion of the track. The motion generator also includes a cart movably coupled to the track, and a magnet arranged to move the cart along the track from a point on the incline portion of the track to at least the apex.

Another aspect of a motion generator includes a track having a declined portion, an inclined portion, and a base where the declined portion of the track meets the inclined portion of the track. The motion generator also includes a cart movably coupled to the track, and a magnet arranged such that the cart moves along the track from a point on the declined portion of the track to a point on the inclined portion by gravitational forces, and moves along the track past the point on the inclined portion of the track by the magnetic force of the magnet.

A further aspect of a motion generator includes a track having at least one incline portion and at least one decline portion. The motion generator also includes a cart movably coupled to the track, and one or more magnets arranged along the track such that cart moves along the track by a combination of gravitational and magnetic forces.

One aspect of a motor includes a track having at least one inline portion and at least one decline portion, a cart movably coupled to the track, one or more magnets arranged along the track such that cart moves along the track by a combination of gravitational and magnetic forces, and a shaft coupled to cart such that the shaft rotates with the movement of the cart along the track.

One aspect of an electric generator includes a track having at least one inline portion and at least one decline portion, a cart movably coupled to the track, one or more magnets arranged along the track such that cart moves along the track by a combination of gravitational and magnetic forces, a rotor coupled to the cart such that the rotor rotates with the movement of the cart along the track, and a stator arranged with the rotor to produce an electrical output from the electric generator.

It is understood that other embodiments of the present invention will become readily apparent to those skilled in the art from the following detailed description, wherein it is shown and described only exemplary embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of exemplary embodiments of the present invention and is not intended to represent the only embodiments in which the present invention can be practiced. The detailed description includes specific details for the purpose of providing a thorough understanding of the present invention. However, it will be apparent to those skilled in the art that the present invention may be practiced without these specific details.

Figure 1:
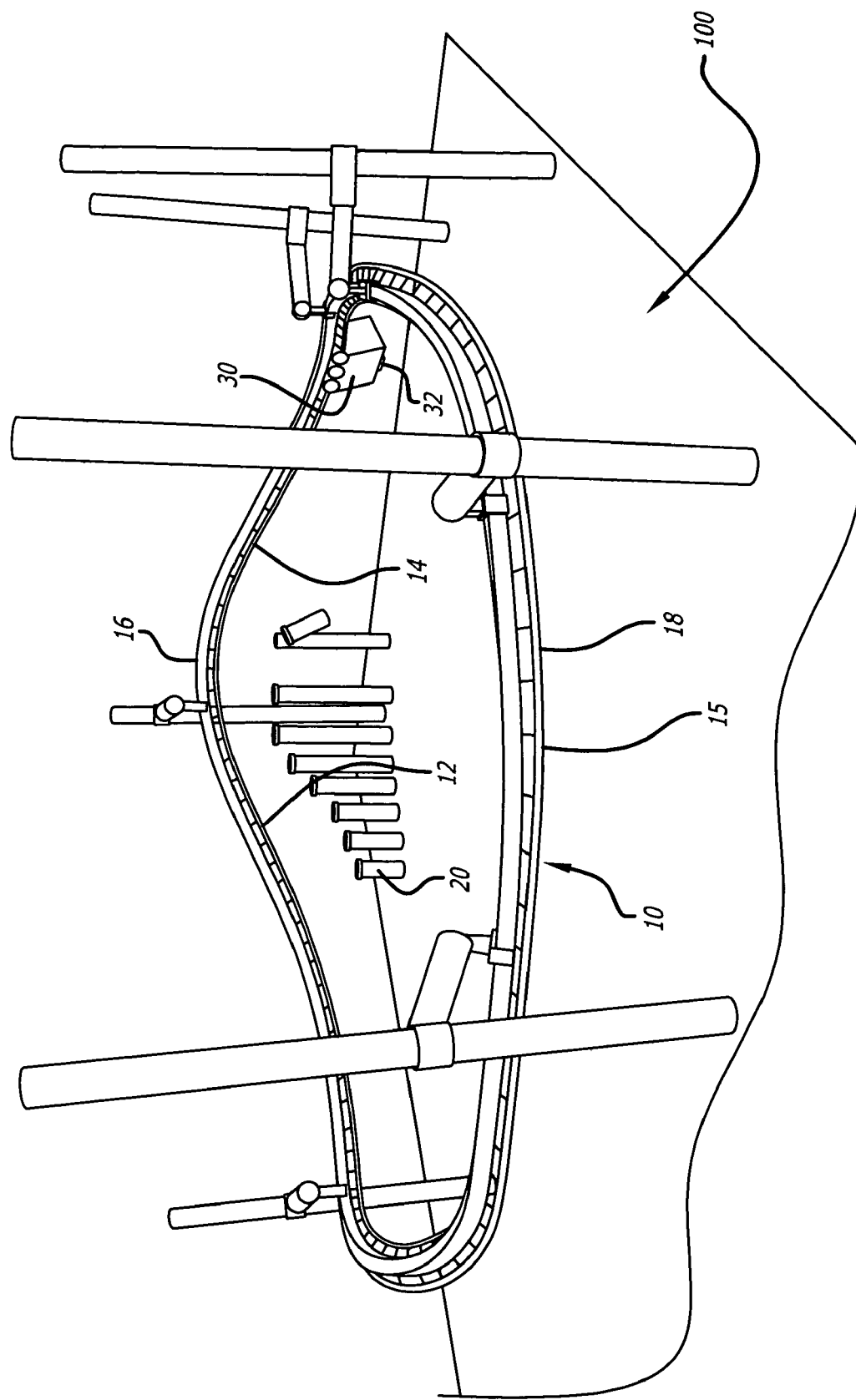
FIG. 1 is a perspective view of the motion generator.

Various embodiments of a motion generator will now be described. As shown in FIG. 1, the motion generator 100 may include a track 10 having an incline portion 12, a decline portion 14, and an apex 16 where the inclined portion 12 of the track 10 meets the decline portion 14 of the track 10. The track 10 is provided so that a cart 30 may be movably coupled thereto. Along the track 10, a magnet 20 may be arranged to move the cart 30 along the track 10 from a point on the incline portion 12 of the track 10 to at least the apex 16.

The cart 30 may include a material which interacts with the magnet 20 to move the cart 30 along the track 10 from the point on the incline portion 12 of the track 10 to at least the apex 16 of the track 10. The material may be characterized as being magnetic, for the material may be attracted to the magnet 20 such a to move the cart 30 along the relevant portion of the track 10. The material may include, but not limited to, iron, steel, or alloy that may have the property to be attracted to a magnet. Alternatively, the cart 30 may include a second magnet 32 which may be attracted to the magnet 20 to move the cart 30 along the relevant portion of the track 10. The second magnet 32 on the cart 30 may comprise a plurality of magnets. The magnets comprising the second magnet 32 may be stacked on the cart 30.

As illustrated in FIG. 1, the cart 30 may be suspended from the track 10 above in skilift-style. Accordingly, the stacked magnets of the second magnet 32 may extend from the cart 30 in a downward direction. The downward extension may be angled so as to maximize the interaction the second magnet 32 may have with the magnet 20 along the track 10.

The cart 30 may further include at least one wheel (not shown) movably coupled to the track 10.

Figure 2:
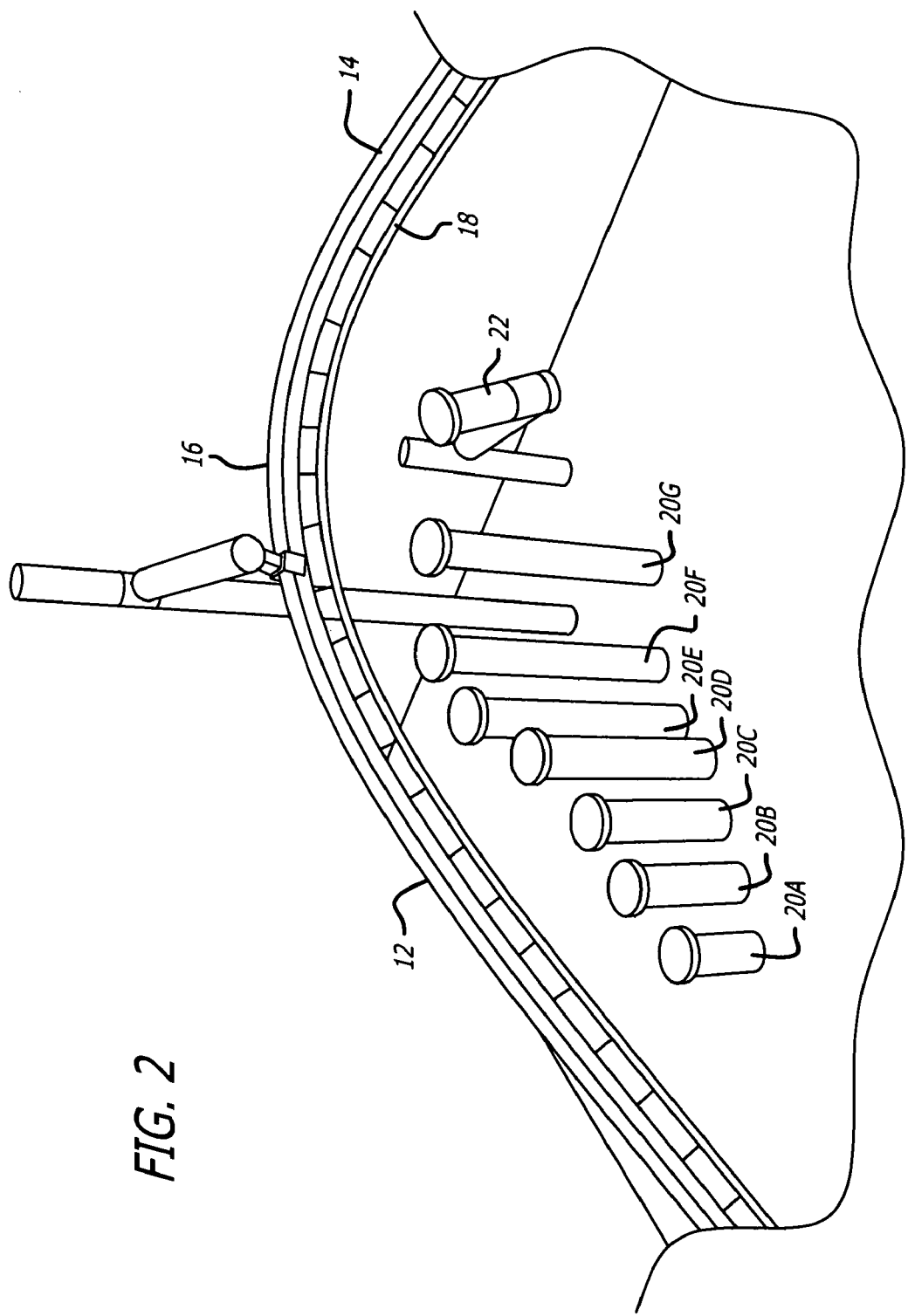
FIG. 2 is a partial perspective view of the motion generator.

FIG. 2 illustrates the magnet 20 along the track 10. The magnet 20 may include a plurality of magnets 20A, 20B, 20C, 20D, 20E, 20F, and 20G. The plurality of magnets 20A, 20B, 20C, 20D, 20E, 20F, and 20G may be positioned along the track 10 from a point on the incline portion 12 of the track 10 through the apex 16.

These magnets 20A, 20B, 20C, 20D, 20E, 20F, and 20G may include a respective stack of magnets. It may be that the number of magnets in each of the respective stacks increases from the point on the incline portion 12 of the track 10 to the apex 16. For example, the magnet 20A may include one magnet disc, the magnet 20B may include two magnet discs, the magnet 20C may include three magnet discs, and so forth. As the number of magnet disc increases, the power of magnetism may increase proportionally.

The increasing power of magnetism as described above may help pull the cart 30 (see FIG. 1) through the inclined portion 12 of the track 10, while building the potential energy on the cart 30. The potential energy which has been built up on the cart 30 may be released as energy of motion, i.e., kinetic energy, after the cart 30 passes the apex 16 of the track 10.

Because of the high power of magnetism between the magnet 20G placed near the apex 16 and the cart 30, the power of gravity may not be sufficient to bring the cart 30 from the apex 16 down through the decline portion 14 of the track 10, and the cart 30 may get stuck at the apex 16.

To ensure a continuous movement of the cart 30 through the track 10, the magnet 22 may be placed at the point of decline portion 14 of the track 10. The magnet 22 may include a stack of magnets, like the magnets 20A-G. In order to attract the cart 30 away from the magnet 20G near the apex 16, the magnet 22 may have more number of magnet discs than the magnet 20G. As illustrated in FIG. 2, the magnet 22 may be angled so as to maximize its magnetic power upon the cart 30 as the cart 30 moves through the apex 16. Once the cart 30 moves past the apex 16, with or without the assistance of the magnet 22, the cart 30 may move down through the rest of the track 10 (see FIG. 1) by gravitational forces.

Returning to FIG. 1, the track 10 may include a pair of rails 18, along which the cart 30 may travel. The track 10 may also have a base 15 where the decline portion 14 of the track 10 meets the incline portion 12 of the track 10. The magnet 20 may be arranged such that the cart 30 may move along the track 10 from a point on the decline portion 14 of the track 10 to a point on the incline portion 12 by gravitational forces, and then move along the track 10 past the point on the inclined portion 12 and the apex 16 of the track 10 by the magnetic force of the magnet 20.

The motion generator may be used for any number of applications. By way of example, the motion generator may be used as a power source for a motor as shown in FIG. 6. The motor can be used for any suitable purpose, including by way of example, machining operations, automotive devices, aerospace devices, medical devices, power generation, industrial devices, robotics, pumps, compressors, and the like. Those skilled in the art will be readily able to configure the motion generator for any particular motor application depending on the specific performance requirements and the overall design constraints.

Figure 3:
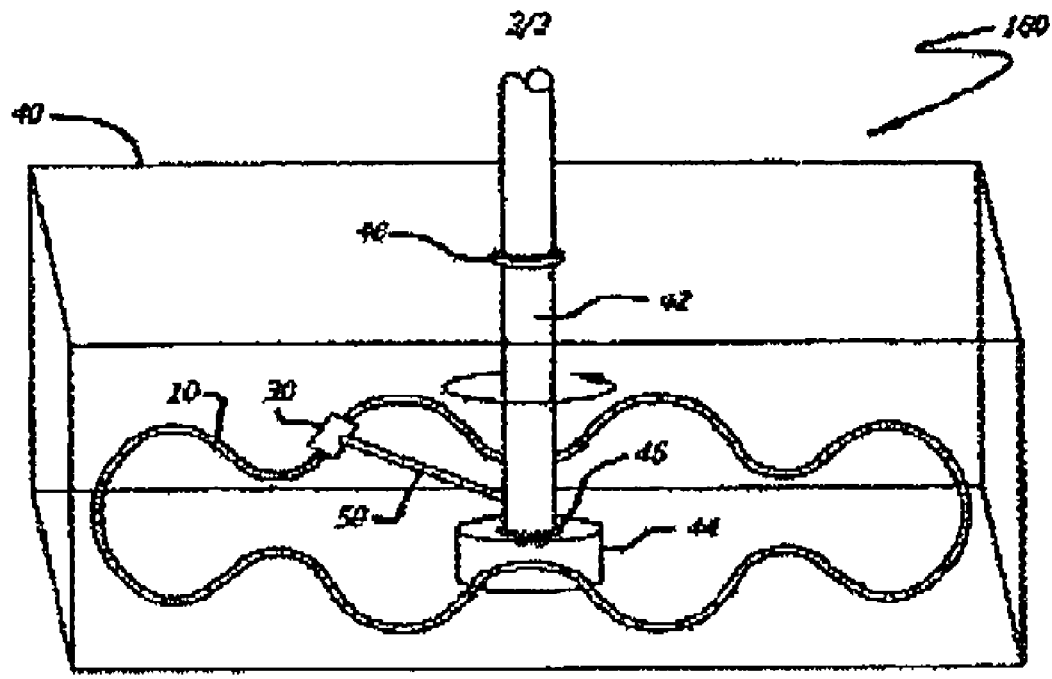
FIG. 3 is a perspective view of a motor using a motion generator.

Referring to FIG. 3, the motion generator 100 is shown enclosed in a housing 40. Extending from the housing 40, is a shaft 42 that can be used to provide rotary motion to drive an external load (not shown). The shaft 42 may be supported in the housing 40 by a base 44 or by other means. The base 44 is shown as a cylindrical block with an axial bore extending through the center, but could have any shape. One end of the shaft 42 may be inserted into the axial bore of the base 44 with the other end of the shaft extending through the housing 40. The shaft 42 may be coupled to the base 44 by ball bearings 46 so that it may freely rotate. Ball bearings 48 may also be used between the shaft 42 and the housing.

The shaft 42 may be rotated by the movement of the cart 30 along the track 10 due to a combination of gravitational and magnetic forces as described in greater detail earlier. Movement of the cart may be converted to rotary motion of the shaft 42 using an arm 50. The specific implementation of the arm 50 may depend on the track design of the motion generator 100. By way of example, the arm 50 may have a swivel connection to the cart 30 at one end, and a swivel connection to the shaft 42 at the other end. The swivel connection may be implemented by any means known in the art. The arm 50 may also be extendable and retractable as the cart 30 moves along the track 10. Those skilled in the art will be readily able to determine the appropriate mechanical design of the arm 50 for any particular application.

Figure 4:
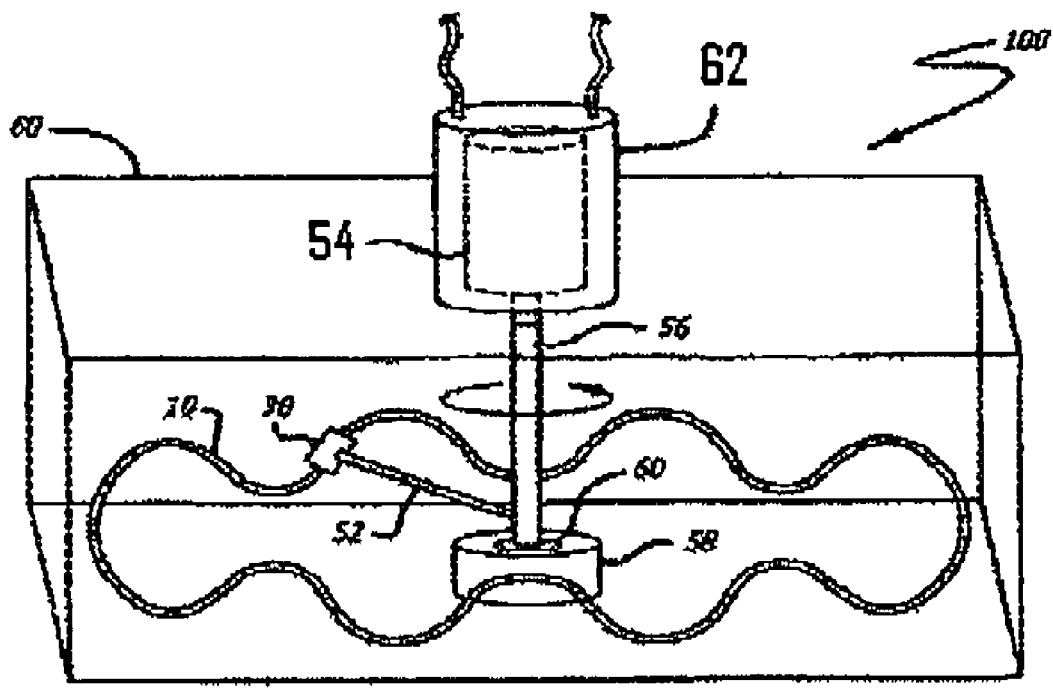
FIG. 4 is a perspective view of an electric generator using a motion generator.

The motion generator may be used as a power source for an electric generator as shown in FIG. 4. The electric generator may be Configured by one skilled in the art for any suitable application, including by way of example, machining operations, automotive devices, aerospace devices, medical devices, power generation, industrial devices, robotics, pumps, compressors, and the like.

Referring to FIG. 4, the motion generator 100 is shown with a cart 30 that moves along a track under the combination of gravitational and magnetic forces as described in greater detail earlier. An arm 52 connected to the cart 30 may be used to rotate a rotor 54. The rotor 54 may include a shaft 56 that is supported by a base 58, or by some other means, in a housing 60. The base 58 is shown as a cylindrical block with an axial bore extending through the center, but could have any shape. The shaft 56 be inserted into the axial bore of the base 58. The shaft 56 may be coupled to the base 58 by ball bearings 60 so that it may freely rotate.

The manner in which the arm 52 connects the cart to the rotor 54 may vary depending on the track design of the motion generator 100. By way of example, the arm 52 may have a swivel connection to the cart 30 at one end, and a swivel connection to the rotor 54 at the other end. The swivel connection may be implemented by any means known in the art.

The arm 52 may also be extendable and retractable as the cart 30 moves along the track 10. Those skilled in the art will be readily able to determine the appropriate mechanical design of the arm 52 for any particular application.

The electric generator also includes a hollow cylindrical stator 62. The stator 62 include one or more windings with leads extending outside the housing 60 for connection to an external load. The rotor 54 may include a number of magnets arranged around a cylindrical surface. The magnets may be permanent magnets or electromagnets. The rotor 54 may be disposed inside the hollow portion of the stator 62 with the magnets arranged to interact with the stator windings. In this configuration, the rotor 54 is rotated by the movement of the cart 30 along the track 10 resulting in a rotating magnetic field inside the stator 62. The rotating magnetic field induces a voltage across the lead extending out from the housing 60.

Alternatively, a number of magnets may be disposed within the interior of the stator 62. The magnets may be permanent magnets or electromagnets. The rotor may include one or more windings arranged to interact with the stator magnets. In this configuration, a voltage is induced in the windings when the rotor 54 is rotated by the movement of the cart 30 along the track 10. The induced voltage is coupled to brushes through a commutator. The brushes may be connected to leads that extend out from the housing 60 to connect to an external electrical load.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A motor, comprising:
   a track having at least one incline portion and at least one decline portion;
   a cart movably coupled to the track;
   one or more magnets arranged along the track such that cart moves along the track by a combination of gravitational and magnetic forces; and
   a shaft coupled to cart such that the shaft is rotated by the movement of the cart along the track, the shaft being configured to drive a mechanical load external to the motor.

2. The motor of claim 1 wherein the cart further comprises at least one wheel movably coupled to the track.

3. The motor of claim 1 wherein the cart includes a material which interacts with the magnet to pull the cart up and over each of said at least one incline portion of the track.

4. The motor of claim 3 wherein the material is a second magnet.

5. The motor of claim 4 wherein the second magnet comprises a plurality of magnets.

6. The motor of claim 5 wherein the magnets comprising the second magnet are stacked on the cart.

7. The motor of claim 6 wherein the stacked magnets extend from the cart in a downward direction.

8. The motor of claim 7 wherein the stacked magnets extend from the cart in a downward angled direction.

9. The motor of claim 1 wherein the magnet comprises a plurality of magnets positioned along the track to pull the cart up and over each of said at least one incline portion of the track.

10. The motor of claim 1 further comprising a housing enclosing the track, the cart, and said one or more magnets, the shaft having a first portion coupled to the cart inside the housing and a second portion extending through the housing, whereby the second portion of the shaft is configured to drive an external load.

11. The motor of claim 10 wherein the second portion of the shaft extends through a surface of the housing, the second portion of the shaft being rotably coupled to said surface of the housing.

12. The motor of claim 1 further comprising an arm coupling the cart to the shaft.

13. The motor of claim 12 wherein the track extends along a circle, and wherein the shaft extends in an axial direction through the central axis of the track.

14. The motor of claim 13 wherein the arm includes a first end having a swivel connection to the cart and a second end having a swivel connection to the shaft.

15. An electric generator, comprising:
    a track having at least one incline portion and at least one decline portion;
    a cart movably coupled to the track;
    one or more magnets arranged along the track such that cart moves along the track by a combination of gravitational and magnetic forces;
    a rotor coupled to the cart such that the rotor is rotated by the movement of the cart along the track; and
    a stator arranged with the rotor to produce an electrical output from the electric generator.

16. The electric generator of claim 15 wherein the cart further comprises at least one wheel movably coupled to the track.

17. The electric generator of claim 15 wherein the cart includes a material which interacts with the magnet to pull the cart up and over each of said at least one incline portion of the track.

18. The electric generator of claim 17 wherein the material is a second magnet.

19. The electric generator of claim 18 wherein the second magnet comprises a plurality of magnets.

20. The electric generator of claim 19 wherein the magnets comprising the second magnet are stacked on the cart.

21. The electric generator of claim 20 wherein the stacked magnets extend from the cart in a downward direction.

22. The electric generator of claim 21 wherein the stacked magnets extend from the cart in a downward angled direction.

23. The electric generator of claim 15 wherein the magnet comprises a plurality of magnets positioned along the track to pull the cart up and over each of said at least one incline portion of the track.

24. The electric generator of claim 15 wherein the rotor comprises a magnet, and the stator comprises a coil, the electrical output being provided by the stator coil.

25. The electric generator of claim 24 wherein the rotor magnet comprises an electromagnet.

26. The electric generator of claim 15 wherein the stator comprises a magnet, and the rotor comprises a coil, the electrical output being provided by the rotor coil.

27. The electric generator of claim 26 wherein the stator magnet comprises an electromagnet.

28. The electric generator of claim 15 further comprising a housing enclosing the track, the cart, said one or more magnets, the rotor, and the stator, the electric generator further comprising one or more electrical leads extending from the housing to provide the electrical output, the one or more leads being coupled to the stator or the rotor in the housing.

29. The electric generator of claim 15 further comprising an arm coupling the cart to the rotor.

30. The electric generator of claim 29 wherein the track extends along a circle, and wherein the rotor extends in an axial direction through the central axis of the track.

31. The electric generator of claim 30 wherein the arm includes a first end having a swivel connection to the cart and a second end having a swivel connection to the rotor.

* * * * *